United States Patent
Liu et al.

(10) Patent No.: US 10,248,249 B2
(45) Date of Patent: Apr. 2, 2019

(54) ARRAY SUBSTRATE, DISPLAY PANEL AND DISPLAY APPARATUS HAVING THE SAME, AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaochuan Chen, Beijing (CN); Weijei Zhao, Beijing (CN); Changfeng Li, Beijing (CN); Xiaoliang Ding, Beijing (CN); Shengji Yang, Beijing (CN); Hongjuan Liu, Beijing (CN); Wei Liu, Beijing (CN); Lei Wang, Beijing (CN); Ming Yang, Beijing (CN); Rui Xu, Beijing (CN); Liguang Deng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 188 days.

(21) Appl. No.: 15/501,849

(22) PCT Filed: Jul. 1, 2016

(86) PCT No.: PCT/CN2016/088174
§ 371 (c)(1),
(2) Date: Feb. 5, 2017

(87) PCT Pub. No.: WO2017/005147
PCT Pub. Date: Jan. 12, 2017

(65) Prior Publication Data
US 2017/0242533 A1 Aug. 24, 2017

(30) Foreign Application Priority Data
Jul. 9, 2015 (CN) .......................... 2015 1 0400939

(51) Int. Cl.
*G06F 3/041* (2006.01)
*G02F 1/133* (2006.01)
(Continued)

(52) U.S. Cl.
CPC ........ *G06F 3/0416* (2013.01); *G02F 1/13318* (2013.01); *G02F 1/13338* (2013.01);
(Continued)

(58) Field of Classification Search
CPC combination set(s) only.
See application file for complete search history.

(56) References Cited

U.S. PATENT DOCUMENTS

2005/0219229 A1 10/2005 Yamaguchi
2006/0244693 A1* 11/2006 Yamaguchi ......... G02F 1/13338
345/76

(Continued)

FOREIGN PATENT DOCUMENTS

CN 1689025 A 10/2005
CN 1967343 A 5/2007
(Continued)

OTHER PUBLICATIONS

International Search Report & Written Opinion dated Sep. 26, 2016 regarding PCT/CN2016/088174.
(Continued)

*Primary Examiner* — Jennifer Mehmood
*Assistant Examiner* — Deeprose Subedi
(74) *Attorney, Agent, or Firm* — Intellectual Valley Law, P.C.

(57) ABSTRACT

The present application discloses a display apparatus including a liquid crystal display (LCD) panel having an array of
(Continued)

a plurality of LCD pixel units; each LCD pixel unit including one or more LCD subpixels, at least some of the plurality of LCD pixel units having a semiconductor photodetector in at least one LCD subpixel for detecting biometric information; and an active matrix organic light emitting display (AMOLED) panel having an array of a plurality of AMOLED pixel units, each AMOLED pixel unit including one or more AMOLED subpixels, each of which having an organic light emitting diode. Each AMOLED subpixel corresponds to one or more LCD subpixel.

20 Claims, 7 Drawing Sheets

(51) Int. Cl.
*G02F 1/1333* (2006.01)
*G06K 9/00* (2006.01)
*G09G 3/3225* (2016.01)
*G09G 3/3266* (2016.01)
*G09G 3/36* (2006.01)
*G06F 3/044* (2006.01)

(52) U.S. Cl.
CPC ......... *G06F 3/0412* (2013.01); *G06K 9/0008* (2013.01); *G06K 9/00013* (2013.01); *G09G 3/3225* (2013.01); *G09G 3/3266* (2013.01); *G09G 3/3611* (2013.01); *G09G 3/3677* (2013.01); *G02F 2001/13312* (2013.01); *G06F 3/044* (2013.01); *G09G 2300/023* (2013.01); *G09G 2310/0205* (2013.01); *G09G 2310/08* (2013.01); *G09G 2354/00* (2013.01); *G09G 2360/14* (2013.01)

(56) References Cited

U.S. PATENT DOCUMENTS

| | | | |
|---|---|---|---|
| 2007/0109239 A1* | 5/2007 | den Boer | G02F 1/13338 345/87 |
| 2017/0108967 A1* | 4/2017 | Hamaguchi | G06F 3/044 |

FOREIGN PATENT DOCUMENTS

| | | |
|---|---|---|
| CN | 100433121 C | 11/2008 |
| CN | 102043516 A | 5/2011 |
| CN | 103019476 A | 4/2013 |
| CN | 103915481 A | 7/2014 |
| CN | 204808837 U | 11/2015 |

OTHER PUBLICATIONS

The Third Office Action in the Chinese Patent Application No. 201510400939.1, dated Jan. 2, 2018; English translation attached.
The Fourth Office Action in the Chinese Patent Application No. 201510400939.1, dated May 23, 2018; English translation attached.

* cited by examiner

FIG. 5

Providing a plurality of scan signals to the plurality of scan lines row-by-row; each scan line in a first time period applies a scan signal to each subpixel in the row of subpixels, allowing a data signal be passed from a corresponding data line to the each subpixel for producing a subpixel of image based on the data signal.

Providing a plurality of control voltage signals to the plurality of signal lines row-by-row; each signal line in a second time period applies a control voltage signal via the control voltage terminal to each semiconductor photodetector in the row of subpixels for detecting a biometric signal associated with a reflection intensity signal of the subpixel of image in each pixel unit.

Providing a plurality of additional scan signals to the plurality of additional scan lines row-by-row; each additional scan line in the second time period applies an additional scan signal to the each semiconductor photodetector in the row of subpixels to transmit the biometric signal generated in the each pixel unit to a corresponding read line; the second time period being later in time than the first time period.

ARRAY SUBSTRATE, DISPLAY PANEL AND DISPLAY APPARATUS HAVING THE SAME, AND DRIVING METHOD THEREOF

CROSS-REFERENCE TO RELATED APPLICATION

This application is a national stage application under 35 U.S.C. § 371 of International Application No. PCT/CN2016/088174, filed Jul. 1, 2016, which claims priority to Chinese Patent Application No. 201510400939.1, filed Jul. 9, 2015, the contents of which are incorporated by reference in the entirety.

TECHNICAL FIELD

The present invention relates to display technology, more particularly, to an array substrate, a display panel and a display apparatus having the same, and a driving method thereof.

BACKGROUND

Liquid crystal display (LCD) is characterized by its low radiation and advantages of small size and low power consumption and has been widely used in tablet PCs, TVs or mobile phones and other electronic products. However, conventional LCD monitors do not have any palmprint or fingerprint recognition functionality.

SUMMARY

In one aspect, the present invention provides a display apparatus comprising a liquid crystal display (LCD) panel comprising an array of a plurality of LCD pixel units; each LCD pixel unit comprising one or more LCD subpixels, at least some of the plurality of LCD pixel units comprising a semiconductor photodetector in at least one LCD subpixel for detecting biometric information; and an active matrix organic light emitting display (AMOLED) panel comprising an array of a plurality of AMOLED pixel units, each AMOLED pixel unit comprising one or more AMOLED subpixels, each of which comprising an organic light emitting diode; each AMOLED subpixel corresponds to one or more LCD subpixel.

Optionally, each LCD pixel unit comprises a subpixel region and an intersubpixel region, the semiconductor photodetector is within an area corresponding to the intersubpixel region.

Optionally, the liquid crystal display panel further comprises a plurality of scan lines and a plurality of data lines, each scan line being connected to a row of LCD subpixels, each data line being connected to a column of LCD subpixels; and a plurality of read lines, each read line being connected to each semiconductor photodetector in a column of LCD subpixels having the semiconductor photodetector in a column of LCD pixel units; the plurality of scan lines are configured to drive the plurality of LCD pixel units; each scan line in a first time period is configured to apply a scan signal to each LCD subpixel in the row of LCD subpixels to allow a data signal be passed from a corresponding data line to the each LCD subpixel to produce a subpixel of image based on the data signal; each read line in a second time period is configured to transmit a biometric signal from the each semiconductor photodetector, the second time period being later in time than the first time period.

Optionally, the semiconductor photodetector is configured to detect a difference between a first biometric signal change corresponding to a ridge line of a touching palm or finger and a second biometric signal change corresponding to a valley line of a touching palm or finger.

Optionally, the display apparatus further comprises a plurality of touch electrodes and a plurality of touch signal lines, each touch electrode being connected to each touch signal line in a one-to-one relationship; wherein each touch signal line in a touch detection time period is configured to apply a touch signal to each touch electrode for detecting a touch event at each touch electrode thereby determining a plurality of LCD pixel units in a touch area where the touch event is detected.

Optionally, the plurality of scan lines are configured to drive the plurality of LCD pixel units in at least a portion of the touch area; each scan line in the first time period is configured to apply the scan signal to each LCD subpixel in the row of LCD subpixels in the at least a portion of the touch area to allow the data signal be passed from a corresponding data line to the each LCD subpixel to produce a subpixel of image based on the data signal; each read line in the second time period is configured to transmit the biometric signal from each semiconductor photodetector in the touch area, the second time period being later in time than the first time period.

Optionally, the active matrix organic light emitting display panel is configured to turn off image display in a plurality of AMOLED subpixels substantially outside at least a portion of the touch area, and display an image in a plurality of AMOLED subpixels substantially within the at least a portion of the touch area.

Optionally, each AMOLED subpixel corresponds to each LCD subpixel in a one-to-one relationship.

Optionally, the liquid crystal display panel further comprises a plurality of control voltage terminals, each control voltage terminal being connected to the semiconductor photodetector in a one-to-one relationship; a plurality of signal lines, each of which is connected to a row of control voltage terminals in a row of LCD pixel units for providing a control voltage signal; and a plurality of additional scan lines, each additional scan line being connected to a row of semiconductor photodetectors in a row of LCD pixel units; wherein each semiconductor photodetector comprises the second transistor, and a third transistor comprising a gate node connected to a corresponding additional scan line and a second node connected to a corresponding read line; each LCD subpixel comprises a first transistor and a pixel electrode; the first transistor comprising a gate node connected to a corresponding scan line, a first node connected to a corresponding data line, and a second node connected to the pixel electrode; each semiconductor photodetector comprises a second transistor; the second transistor being a phototransistor comprising a gate node and a first node commonly connected to a corresponding control voltage terminal and a second node connected to a corresponding read line.

Optionally, each LCD pixel unit comprises a red subpixel, a green subpixel, and a blue subpixel, wherein the blue subpixel includes the semiconductor photodetector.

Optionally, lire plurality of scan lines, the plurality of signal lines, and the plurality of additional scan lines are configured to drive the plurality of LCD pixel units; each scan line in a first time period is configured to apply a scan signal to each LCD subpixel in the row of LCD subpixels, allowing a data signal be passed from a corresponding data line to the each LCD subpixel to produce a subpixel of image based on the data signal; each signal line in a second time period is configured to apply a control voltage signal via the control voltage terminal to each semiconductor photodetector in the row of LCD subpixels for detecting a biometric signal in each LCD pixel unit; and each additional scan line in the second time period is configured to apply an additional scan signal to the each semiconductor photodetector in the row of LCD subpixels to transmit the biometric signal at the each LCD pixel unit to a corresponding read line; the second time period being later in time than the first time period.

Optionally, the plurality of scan lines, the plurality of additional scan lines, and the plurality of signal lines are configured to drive the plurality of LCD pixel units; each scan line in a first time period is configured to apply a scan signal to each LCD subpixel in the row of LCD subpixels to switch on a corresponding first transistor, allowing a data signal be passed from a corresponding data line to a corresponding pixel electrode to produce a subpixel of image based on the data signal; each signal line in a second time period is configured to apply a control voltage signal via the control voltage terminal to each phototransistor in the row of LCD subpixels for detecting a biometric signal in each LCD pixel unit; and each additional scan line in the second time period is configured to apply an additional scan signal to switch on the third transistor in the row of LCD subpixels for transmiting the biometric signal detected in each LCD pixel unit to a corresponding read line; the second time period being later in time than the first time period.

Optionally, the control voltage signal is configured to be in a range such that a difference between a first photocurrent change corresponding to a ridge line of a touch palm or finger and a second photocurrent change corresponding to a valley line of a touching palm or finger is substantially maximized.

Optionally, the display apparatus further comprises a signal processor, the signal processor comprising a plurality of amplifiers connected to the plurality of read lines in a one-to-one relationship for amplifying read line signals, and a plurality of differentiators for generating a differential value based on amplified read line signals derived from two read line signals of any two neighboring read lines.

in another aspect, the present invention provides a method for driving an operation of a display apparatus comprising a liquid crystal display panel (LCD) comprising an array of a plurality of LCD pixel units; each LCD pixel unit comprising one or more LCD subpixels, at least some of the plurality of LCD pixel units comprising a semiconductor photodetector in at least one LCD subpixel for detecting biometric information; a plurality of scan lines and a plurality of data lines, each scan line being connected to a row of LCD subpixels, each data line being connected to a column of LCD subpixels; and a plurality of read lines, each read line being connected to each semiconductor photodetector in a column of LCD subpixels having the semiconductor photodetector in a column of LCD pixel units; and an active matrix organic light emitting display (AMOLED) panel comprising an array of a plurality of AMOLED pixel units, each AMOLED pixel unit comprising one or more AMOLED subpixels, each of which comprising an organic light emitting diode; wherein the liquid crystal display panel and the active matrix organic light emitting display panel are configured so that each AMOLED subpixel corresponds to one or more subpixel; the method comprising providing a plurality of scan signals to the plurality of scan lines in a first time period of each frame of image; each scan line in the first time period applies a scan signal to each LCD subpixel in the row of LCD subpixels to allow a data signal be passed from a corresponding data line to the each LCD subpixel to produce a subpixel of image based on the data signal; and transmitting a plurality of biometric signals through the plurality of read lines; each read line in a second time period is configured to transmit a biometric signal from the each semiconductor photodetector, the second time period being later in time than the first time period.

Optionally, the display apparatus further comprising a plurality of touch electrodes and a plurality of touch signal lines, each touch electrode being connected to each touch signal line in a one-to-one relationship; the method further comprising providing a plurality of touch signals to the plurality of touch electrodes through the plurality of touch signal lines in a touch detection time period of each frame of image; each touch signal line in the touch detection time period applies a touch signal to each touch electrode for detecting a touch event at each touch electrode thereby determining a plurality of LCD pixel units in a touch area where the touch event is detected.

Optionally, the method comprises providing the plurality of scan signals to the plurality of scan lines in the first time period of each frame of image; each scan line in the first time period applies the scan signal to each LCD subpixel in the row of LCD subpixels in at least a portion of the touch area to allow a data signal be passed from a corresponding data line to the each LCD subpixel to produce a subpixel of image based on the data signal; and transmitting a plurality of biometric signals through the plurality of read lines; each read line in the second time period is configured to transmit a biometric signal from each semiconductor photodetector in the at least a portion of the touch area, the second time period being later in time than the first time period.

Optionally, the method comprises providing a plurality of AMOLED scan signals to a plurality of AMOLED scan lines in the first time period of each frame of image; each AMOLED scan line in the first time period applies an AMOLED scan signal to each AMOLED subpixel in the row of AMOLED subpixels in at least a portion of the touch area to allow a AMOLED data signal be passed from a corresponding AMOLED data line to the each AMOLED subpixel to produce a subpixel of image based on the AMOLED data signal.

Optionally, the liquid crystal display panel further comprises a plurality of scan lines and a plurality of data lines, each scan line being connected to a row of LCD subpixels, each data line being connected to a column of LCD subpixels; a plurality of control voltage terminals, each control voltage terminal being connected to the semiconductor photodetector in a one-to-one relationship; a plurality of read lines, each read line being connected to each semiconductor photodetector in a column of LCD pixel units; a plurality of signal lines, each of which is connected to a row of control voltage terminals in a row of LCD pixel units for providing a control voltage signal; and a plurality of additional scan lines, each additional scan line being connected to a row of semiconductor photodetectors in a row of LCD pixel units; wherein each semiconductor photodetector comprises the second transistor, and a third transistor comprising a gate node connected to a corresponding additional scan line and a second node connected to a corresponding read line; each LCD subpixel comprises a first transistor and a pixel electrode; the first transistor comprising a gate node connected to a corresponding scan line, a first node connected to a corresponding data line, and a second node connected to the pixel electrode; and each semiconductor photodetector comprises a second transistor; the second transistor being a phototransistor comprising a gate node and a first node commonly connected to a corresponding control voltage terminal and a second node connected to a corresponding read line; the method comprising providing a plurality of scan signals to the plurality of scan lines in a first time period of each frame of image; each scan line in the first time period applies a scan signal to each LCD subpixel in the row of LCD subpixels to allow a data signal be passed from a corresponding data line to the each LCD subpixel to produce a subpixel of image based on the data signal; providing a plurality of control voltage signals to the plurality of signal lines in a second time period of each frame of image; each signal line in the second time period applies a control voltage signal via the control voltage terminal to each second transistor in the row of LCD subpixels for detecting a biometric signal in each LCD pixel unit; and providing a plurality of additional scan signals to the plurality of additional scan lines in the second time period of each frame of image; each additional scan line in the second time period applies an additional scan signal to the each third transistor in the row of LCD subpixels for transmitting the biometric signal at the each LCD pixel unit to a corresponding read line; the second time period being later in time than the first time period.

Optionally, the plurality of control voltage signals are provided in a range such that a difference between a first photocurrent change corresponding to a ridge line of a touching palm or finger and a second photocurrent change corresponding to a valley line of a touching palm or finger is substantially maximized.

BRIEF DESCRIPTION OF THE FIGURES

The following drawings are merely examples for illustrative purposes according to various disclosed embodiments and are not intended to limit the scope of the present invention.

FIG. 5 is a flow chart illustrating a method for driving an operation of the array substrate in some embodiments.

DETAILED DESCRIPTION

Figure 1A:
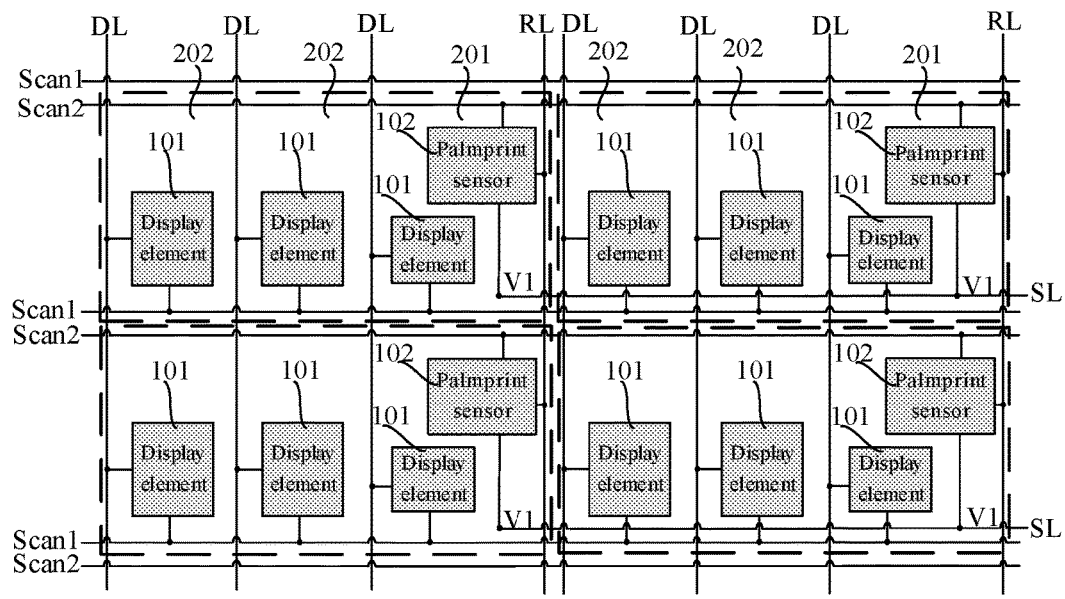
FIG. 1A is a diagram illustrating the structure of an array substrate in some embodiments.

The disclosure will now describe more specifically with reference to the following embodiments. It is to be noted that the following descriptions of some embodiments are presented herein for purpose of illustration and description only, it is not intended to be exhaustive or to be limited to the precise form disclosed.

In one aspect, the present disclosure provides a display apparatus having a liquid crystal display panel and an active matrix organic light emitting display (AMOLED) panel assembled together for detecting biometric information. In some embodiments, the liquid crystal display panel includes an array of a plurality of pixel units; each pixel unit including one or more subpixels, at least some of the plurality of pixel units includes a semiconductor photodetector in at least one subpixel for detecting biometric information. Optionally, at least one subpixel in each pixel unit contains a semiconductor photodetector for detecting biometric information. In some embodiments, the active matrix organic light emitting display panel includes an array of a plurality of AMOLED pixel units, each AMOLED pixel unit including one or more AMOLED subpixels, each of which having an organic light emitting diode. Optionally, the liquid crystal display panel and the active matrix organic light emitting display panel are configured so that each AMOLED subpixel corresponds to one or more subpixel. Optionally, to achieve a higher aperture ratio, the metal lines of the liquid crystal display panel are disposed in an area substantially overlapping in plan view of the display apparatus with an area where the metal lines of the active matrix organic light emitting display panel are disposed. In some embodiments, the display apparatus includes a liquid crystal display (LCD) panel having an array of a plurality of LCD pixel units; each LCD pixel unit including one or more LCD subpixels, at least some of the plurality of LCD pixel units having a semiconductor photodetector in at least one LCD subpixel for detecting biometric information; and an active matrix organic light emitting display (AMOLED) panel having an array of a plurality of AMOLED pixel units, each AMOLED pixel unit including one or more AMOLED subpixels, each of Which having an organic light emitting diode. Each AMOLED subpixel corresponds to one or more LCD subpixel.

The semiconductor photodetector may be any appropriate type of photosensitive cell or phototransistor. Examples of appropriate semiconductor photodetector include, but are not limited to, a photoelectric cell, a photovoltaic cell, a photodiode, a PN photodiode, a PIN photodiode, and an avalanche photodiode.

In some embodiments, the semiconductor photodetector is configured to detect a difference between a first biometric signal change (e.g., a first photocurrent change) corresponding to a ridge line of a touching palm or finger or foot and a second biometric signal change (e.g., a first photocurrent change) corresponding to a valley line of a touching palm or finger or foot.

In one aspect, the present disclosure provides a liquid crystal array substrate that has both image display functionality and biometric signal sensing functionality. A display apparatus having the present array substrate has greatly enhanced sensitivity in detecting biometric signals and accuracy in recognizing the biometric information. As compared to the conventional apparatus, the present display apparatus has a much simplified structure and significantly improved function.

In some embodiments, the array substrate includes an array of a plurality of pixel units, each pixel unit comprising at least three subpixels for image display, at least one of which further comprising a semiconductor photodetector for detecting biometric information (e.g., at least a portion of a touching palm or a touch finger). Being image display subpixels, all subpixels in each pixel unit naturally includes a display element.

In some embodiments, the display element is a liquid crystal display element, and. the subpixel of the present array substrate includes a subpixel of a liquid crystal display. For instance, a display panel or a display apparatus having the present array substrate may be a liquid crystal display panel or a liquid crystal display apparatus. Accordingly, the display element includes a thin film transistor, a pixel electrode, a common electrode, etc. The display panel having this type of display element typically also includes a liquid crystal layer, a packaging substrate opposite to the array substrate, and a backlight module as the light source for image display. Optionally, the backlight is a regular backlight suitable for liquid crystal display, e.g., a light guide plate in combination with a LED light bulb or light strip.

Optionally, the backlight for the liquid crystal display panel is an active matrix organic light emitting diode, each subpixel of the active matrix organic light emitting diode corresponding to each subpixel of the liquid crystal display in a one-to-one relationship. That is, the display panel is a combination of a liquid crystal display component and an active matrix organic light emitting diode backlight component. The liquid crystal display component controls the light emission in the display panel.

In some embodiments, the display element is a display element other than a liquid crystal display element. For instance, the display element is a self-emitting display element. Accordingly, a display panel having the type array substrate does not require a backlight. Optionally, the display element is an organic light emitting diode display element, and the subpixel of the array substrate is an organic light emitting diode subpixel. The organic light emitting diode subpixel may include a light emitting layer, a cathode, an anode, etc.

In some embodiments, the array substrate further includes a plurality of scan lines and a plurality of data lines, each scan line being connected to a row of subpixels, each data line being connected to a column of subpixels. Optionally, the plurality of scan lines and the plurality of data lines cross over each other, defining the plurality of subpixels.

In some embodiments, the array substrate further includes a plurality of control voltage terminals, each control voltage terminal being connected to a semiconductor photodetector in a one-to-one relationship. Optionally, the array substrate further includes a plurality of signal lines, each of which is connected to each control voltage terminal in a row of pixel units for providing a control voltage signal to the semiconductor photodetector via the control voltage terminal. Optionally, the signal line is a common signal line.

In some embodiments, the array substrate further includes a plurality of read lines, each read line being connected to each semiconductor photodetector in a column of pixel units.

In some embodiments, the display element in each subpixel of the arrays substrate includes a first transistor. Optionally, the first transistor is a transistor for a liquid crystal display. Optionally, the first transistor is a transistor for an organic light emitting diode display.

In some embodiments, the display element is a liquid crystal display element, and the display element in each subpixel of the arrays substrate includes a first transistor and a pixel electrode. The first transistor includes a gate node, a first node and a second node. The gate node is connected to a corresponding scan line, the first node is connected to a corresponding data line, and the second node is connected to the pixel electrode in the subpixel. Optionally, the first node is a source node and the second node is a drain node. Optionally, the display element further includes a common electrode. Optionally, the display element further includes a color filter.

In some embodiments, each semiconductor photodetector further includes a second transistor which is a phototransistor having a first node, a second node, and a light sensitive area. The light sensitive area is capable of generating a gate voltage to control a first node-second node current (e.g., a drain-source current). Optionally, the second transistor further includes a gate node. Optionally, the gate node and the first node of the second transistor are commonly connected to a corresponding control voltage terminal. Examples of phototransistors suitable for the present array substrate include, but are not limited to, a field effect phototransistor and a bipolar phototransistor.

In some embodiments, the second node of the second transistor is directly connected to a corresponding read line. For instance, each read line in the array substrate is connected to the second node of each second transistor in a column of pixel units. Optionally, the scan lines and the signal lines of the present array substrate are configured to drive the pixel units on a row-by-row basis. As a result, in each time period a scan signal is applied to a row of subpixels or in each time period a control voltage signal is applied to the phototransistor in a row of subpixels, all other rows do not emit light and do not generate biometric signals. In other words, the phototransistors in all other rows have a negligible leak photocurrent. Accordingly, when the second node of the second transistor is directly connected to a corresponding read line, the read line can detect biometric signals generated from the row of subpixels being driven by a scan line and a signal line.

In some embodiments, each semiconductor photodetector includes a second transistor and a third transistor. The second transistor is a phototransistor having a first node, a second node, and a light sensitive area. The third transistor (e.g. a switch transistor) includes a gate node, a first node, and a second node. The array substrate further includes a plurality of additional scan lines, each additional scan line being connected to each semiconductor photodetector in a row of pixel units. Optionally, the second transistor includes a gate node and a first node commonly connected to a corresponding control voltage terminal and a second node connected to a first node of the third transistor. The gate node of the third transistor is connected to a corresponding additional scan line. The second node of the third transistor is connected to a corresponding read line. Optionally, the scan line and the additional scan line may be a same line.

In some embodiments, the plurality of scan lines and the plurality of signal lines are configured to drive the plurality of pixel units row-by-row. For instance, the semiconductor photodetector may be operated in a time-division driving mode for identifying a palmprint, a fingerprint or a footprint. The time-division driving mode includes a display mode in a first time period and a biometric signal sensing mode in a second time period. Optionally, each frame of image includes a first time period and a second time period. In the first time period, each scan line is configured to apply a scan signal to each subpixel in the row of subpixels, allowing a data signal be passed from a corresponding data line to the each subpixel to produce a subpixel of image based on the data signal. In the second time period, each signal line is configured to apply a control voltage signal via the control voltage terminal to each semiconductor photodetector in the row of subpixels for detecting a biometric signal in each pixel unit. The second time period being later in time than the first time period.

Specifically, each scan line in a first time period is configured to apply a scan signal to each subpixel in the row of subpixels to switch on a corresponding first transistor, allowing a data signal be passed from a corresponding data line to a corresponding pixel electrode to produce a subpixel of image based on the data signal. In the second time period, each signal line is configured to apply a control voltage signal via the control voltage terminal to each phototransistor in the row of subpixels for detecting a biometric signal in each pixel unit. The second time period being later in time than the first time period, In some embodiments, the array substrate further includes an additional scan lines. Optionally, the plurality of scan lines, the plurality of signal lines, and the plurality of additional scan lines are configured to drive the plurality of pixel units row-by-row. For instance, the semiconductor photodetector may be operated in a time-division driving mode for identifying a palmprint, a fingerprint, or a footprint. The time-division driving mode includes a display mode in a first time period and a biometric signal sensing mode in a second time period. Optionally, each frame of image includes a first time period and a second time period. In the first time period, each scan line is configured to apply a scan signal to each subpixel in the row of subpixels, allowing a data signal be passed from a corresponding data line to the each subpixel to produce a subpixel of image based on the data signal. In the second time period, each signal line is configured to apply a control voltage signal via the control voltage terminal to each semiconductor photodetector in the row of subpixels for detecting a biometric signal in each pixel unit; and each additional scan line in the second time period applies an additional scan signal to the each semiconductor photodetector in the row of subpixels to transmit the biometric signal at the each pixel unit to a corresponding read line. The second time period being later in time than the first time period.

Specifically, each scan line in a first time period is configured to apply a scan signal to each subpixel in the row of subpixels to switch on a corresponding first transistor, allowing a data signal be passed from a corresponding data line to a corresponding pixel electrode to produce a subpixel of image based on the data signal. In the second time period, each signal line is configured to apply a control voltage signal via the control voltage terminal to each phototransistor in the row of subpixels for detecting a biometric signal in each pixel unit; and each additional scan line in the second time period applies an additional scan signal to switch on the third transistor in the row of subpixels for transmitting the biometric signal detected in each pixel unit to a corresponding read line. The second time period being later in time than the first time period.

Optionally, the control voltage signal is configured to be in a range such that a difference between a first photocurrent change corresponding to a ridge line of a touching palm or finger or foot and a second photocurrent change corresponding to a valley line of a touching palm or finger or foot is substantially maximized.

Optionally, each pixel unit comprises a red subpixel, a green subpixel, and a blue subpixel, wherein the blue subpixel includes the semiconductor photodetector.

In another aspect, the present disclosure provides a display panel having the array substrate described herein. Optionally, the display panel is a self-emitting type display panel such as an organic light emitting diode display panel. Optionally, the display panel is a liquid crystal display panel. Optionally, the display panel further includes a packaging substrate.

In some embodiments, the display panel includes a backlight module. Optionally, the backlight module includes a light guide plate and a light bulb or a LED light strip. Optionally, the backlight module includes a plurality of active matrix organic light emitting diode pixel units as the light source. Optionally, each active matrix organic light emitting diode pixel unit includes at least three active matrix organic light emitting diode subpixels, each active matrix organic light emitting diode subpixel corresponding to each subpixel of the array substrate in a one-to-one relationship.

In some embodiments, the display panel includes a liquid crystal type array substrate in combination with a backlight module having a plurality of active matrix organic light emitting diode pixel units as the light source. Each active matrix organic light emitting diode pixel unit includes at least three active matrix organic light emitting diode subpixels, each active matrix organic light emitting diode subpixel corresponding to each subpixel of the liquid crystal array substrate in a one-to-one relationship. The liquid crystal array substrate may further include other components necessary for the liquid crystal display, e.g., a pixel electrode and a common electrode. The display panel further includes a packaging substrate (e.g., a color filter substrate) and a liquid crystal layer between the array substrate and the packaging substrate. Optionally, the display panel further includes a color filter. Because this type of display panel utilizes an organic light emitting diode as the backlight (e.g., a RGB OLED), a color filter is not required in the array substrate or in the packaging substrate.

In some embodiments, the display panel further includes a signal processer for processing the biometric signal detected in the array substrate. For instance, the signal processor may include a plurality of amplifiers connected to the plurality of read lines in a one-to-one relationship for amplifying read line signals. Optionally, the signal processor further includes a plurality of differentiators for generating a differential value based on amplified read line signals derived from two read line signals of any two neighboring read lines. Each of the plurality of differentiators generates a differential value between amplified read line signals derived from two read line signals of any two neighboring read lines.

In another aspect, the present disclosure provides a method for driving an operation of the array substrate. For instance, the driving method may include a time-division driving mode for identifying a palmprint, a fingerprint, or a footprint. The time-division driving mode includes a display mode in a first time period and a biometric signal sensing mode in a second time period. Optionally, each frame of image includes a first time period and a second time period. In the first time period, each scan line applies a scan signal to each subpixel in the row of subpixels, allowing a data signal be passed from a corresponding data line to the each subpixel to produce a subpixel of image based on the data signal. In the second time period, each signal line applies a control voltage signal via the control voltage terminal to each semiconductor photodetector in the row of subpixels for detecting a. biometric signal in each pixel unit. The second time period being later in time than the first time period.

In some embodiments, the method includes providing a plurality of scan signals to the plurality of scan lines row-by-row; each scan line in a first time period applies a scan signal to each subpixel in the row of subpixels to allow a data signal be passed from a corresponding data line to the each subpixel to produce a subpixel of image based on the data signal; and providing a plurality of control voltage signals to the plurality of signal lines row-by-row; each signal line in a second time period applies a control voltage signal via the control voltage terminal to each semiconductor photodetector in the row of subpixels for detecting a biometric signal in each pixel unit.

Specifically, each scan line in the first time period applies the scan signal to each subpixel in the row of subpixels to switch on a corresponding first transistor, allowing a data signal be passed from a corresponding data line to a corresponding pixel electrode to produce a subpixel of image based on the data signal. In the second time period, each signal line applies a control voltage signal via the control voltage terminal to each phototransistor in the row of subpixels for detecting a biometric signal in each pixel unit. The second time period being later in time than the first time period.

In some embodiments, the driving method further includes providing a plurality of additional scan signals to the plurality of additional scan lines row-by-row. Optionally, each additional scan line in the second time period applies an additional scan signal to the each semiconductor photodetector in the row of subpixels for transmitting the biometric signal at the each pixel unit to a corresponding read line. The second time period being later in time than the first time period.

Specifically, each scan line in the first time period applies a scan signal to each subpixel in the row of subpixels to switch on a corresponding first transistor, allowing a data signal be passed from a corresponding data line to a corresponding pixel electrode to produce a subpixel of image based on the data signal. In a second time period, each signal line applies a control voltage signal via the control voltage terminal to each phototransistor in the row of subpixels for detecting a biometric signal in each pixel unit and each additional scan line applies an additional scan signal to switch on the third transistor in the row of subpixels for transmitting the biometric signal detected in the each pixel unit to a corresponding read line. The second time period being later in time than the first time period.

Optionally, the plurality of control voltage signals are provided in a range such that a difference between a first photocurrent change corresponding to a ridge line of a touching palm or finger or foot and a second photocurrent change corresponding to a valley line of a touching palm or finger or foot is substantially maximized.

FIG. 1A is a diagram illustrating the structure of an array substrate in some embodiments. Referring to FIG. 1, the array substrate in the embodiment includes an array of a plurality of pixel units arranged in a matrix of multiple rows and columns. Each pixel unit (marked as a dashed box frame) includes at least three subpixels. Each subpixel (201 or 202) includes a display element 101 and at least one subpixel 201 of each pixel unit also includes a semiconductor photodetector 102.

Referring to FIG. 1A, each pixel unit in the embodiment includes only one sub-pixel 201 having both a semiconductor photodetector 102 and a display element 101, and the other two subpixels 202 in the same pixel unit having no semiconductor photodetector 102 but only a display element 101. Optionally, each pixel unit can have more than one subpixels 201 that contain a semiconductor photodetector 102. For example, each pixel unit may have two subpixels 201 each having a semiconductor photodetector 102. Optionally, each of three subpixels in a pixel unit includes a semiconductor photodetector 102. Optionally, every subpixel in a pixel unit includes a semiconductor photodetector 102.

Referring to FIG. 1A, the display element 101 of each subpixel is connected to a scan line Scan1 and a data line DL. Optionally, the scan line Scan1 is along a row direction of the array substrate and the data line DL is along a column direction. In some embodiments, the display element can be configured into an On-state or Off-state by a scan signal loaded from the scan line Scan1. The display element 101 receives a data signal from the data line DL, when the display element 101 is set at an On-state for producing a subpixel of image. On the other hand, the Off-state corresponds to no image display. Optionally, the display elements 101 in each row of the array are commonly connected to a single scan line Scan1, and the display elements 101 in each column of the array are commonly connected to a single data line DL.

The semiconductor photodetector 102 is connected to an additional scan line Scan2, a control voltage terminal V1, and a read line RL. Optionally, the additional scan line Scan2 is along the row direction and the read line RL is along the column direction. In some embodiments, the semiconductor photodetector 102 is driven by a control voltage signal from the control voltage terminal V1 for detecting a biometric signal, and driven by an additional scan signal from the additional scan line Scan2 to transmit the detected biometric signal to the read line RL.

Optionally, the semiconductor photodetectors 102 in each row of the array are commonly connected to a single additional scan line Scan2, and the semiconductor photodetectors 102 in each column of the array are commonly connected to a single read line RL.

In some embodiments, all voltage control terminals V1 corresponding to each row of semiconductor photodetectors 102 are commonly connected to a single signal line SL. The single signal line SL provides a control voltage signal for each control voltage terminal V1. This design reduces numbers of metal lines on the array substrate thereby enhances aperture ratio for image display.

In some embodiments, the biometric signals collected by the semiconductor photodetector 102 include information derived from both valley lines and ridge lines of a palm.

Figure 1B:
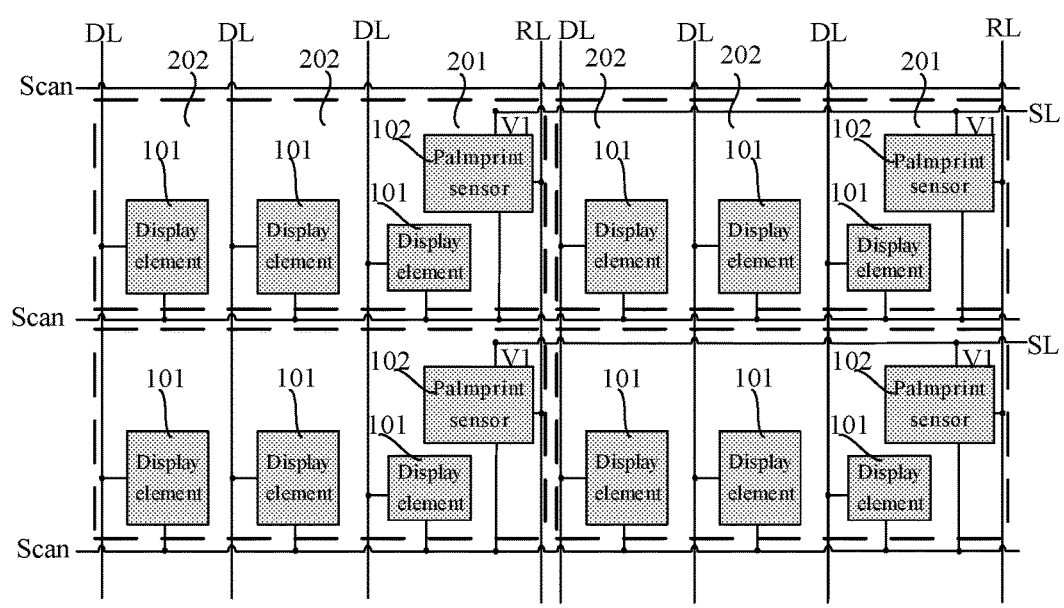
FIG. 1B is a diagram illustrating the structure of an array substrate in some embodiments.

In some embodiments, all display elements 101 and all semiconductor photodetectors 102 in a same row of pixel units are all commonly connected to a single scan line. FIG. 1B is a diagram illustrating the structure of an array substrate in some embodiments. Referring to FIG. 1B, the scan line and the additional scan line is a single scan line Scan.

In the present array substrate, the scan line Scan1 is configured to provide a scan signal to the display element 101 in each subpixel in the row of subpixels, allowing a data signal to be passed from a corresponding data line DL to the display element 101. In this mode, the array substrate performs its image display function. In biometric signal sensing mode, the control voltage terminal V1 is configured to provide a control voltage signal to drive the corresponding semiconductor photodetector 102 for detecting a biometric signal. The additional scan line Scant is configured to provide an additional scan signal to drive the semiconductor photodetector 102 to transmit the detected biometric signal to a corresponding read line RL for biometric information identification. A display apparatus having the present array substrate contains integrated semiconductor photodetectors 102, thus can perform both image display function and biometric signal recognition function. As a biometric signal detection and recognition device, the display apparatus having the present array substrate has greatly enhanced sensitivity in detecting biometric signals and accuracy in recognizing the biometric information. As compared to the conventional apparatus, the present display apparatus has a much simplified structure and significantly improved function.

Figure 2:
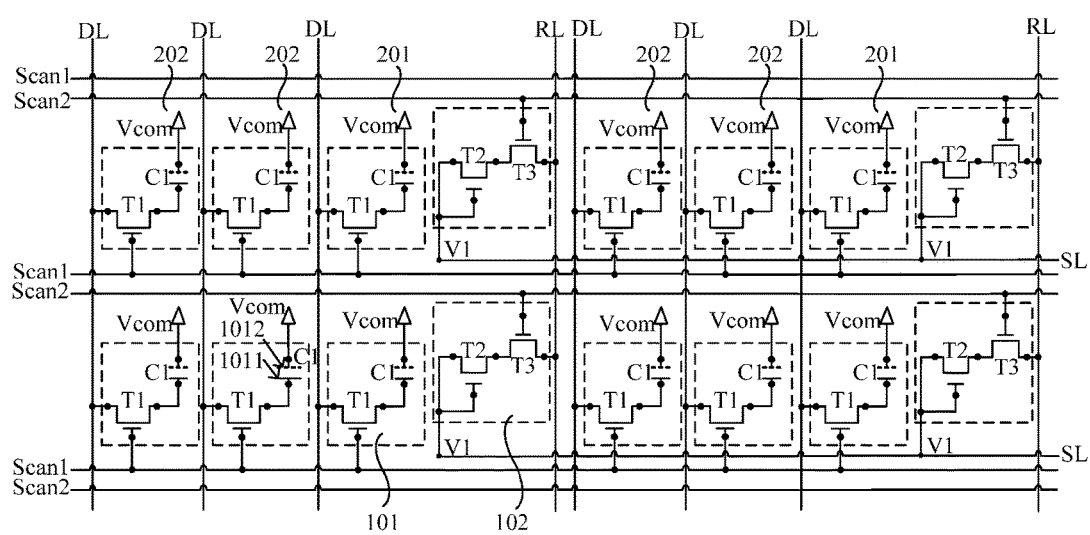
FIG. 2 is a diagram illustrating the circuits of an array substrate in some embodiments.

FIG. 2 is a diagram illustrating the circuits of an array substrate in some embodiments. Referring to FIG. 2, the display element 101 in the embodiment includes a first transistor T1 and a pixel electrode 1011. The first transistor T1 has a gate node, a first node, and a second node. The gate node is connected to the scan line Scan1 next to the display element 101. The first node is connected to a data line DL corresponding to the subpixel containing the display element 101. The second node is connected to the pixel electrode 1011.

Referring to FIG. 2, the common electrode 1012 can be directly formed in the array substrate as part of the display element 101 in each subpixel of each pixel unit of the array substrate. Optionally, the common electrode 1012 can be formed in a package substrate (e.g., a color filter substrate) opposing to the array substrate for forming a display panel or a display apparatus in general. The pixel electrode 1011 forms a first capacitor C1 with the common electrode 1012. The common electrode is electrically connected to a common voltage node Vcom.

Referring to FIG. 2, each semiconductor photodetector 102 includes a second transistor T2 and a third transistor T3. In particular, the second transistor T2 is a phototransistor including a gate node, a first node, and a second node. The third transistor T3 (e.g., a regular three-terminal switch transistor) also includes a gate node, a first node, and a second node. Both the gate node and the first node of T2 are connected to the control voltage terminal V1 associated with the semiconductor photodetector 102. The second node of T2 is connected to the first node of T3. The gate node of T3 is connected to the additional scan line Scant associated with the semiconductor photodetector 102 and the second node of T3 is connected to a corresponding read line RL next to the semiconductor photodetector 102.

The semiconductor photodetector 102 described herein is capable of identifying various biometric information (e.g., palmprints, fingerprints, footprints) based on light refraction and reflection principle. When a palm (or a portion of a palm) touches the surface of a display panel having the present array substrate, light emitted from each subpixel irradiates on the valley lines and ridge lines of the palm, partly refracts and partly reflects back to the subpixel, and irradiate on the phototransistor T2 of the semiconductor photodetector 102. The refractive angle and reflection intensity of the light refracted and reflected from the valley lines are different from those of the light refracted and reflected from the ridge lines. This results in different photo-currents produced in the phototransistor T2 corresponding to the valley lines and the phototransistor T2 corresponding to the ridge lines when the refracted and reflected light irradiates on the phototransistors T2. The photo-currents are transmitted to a signal processor through the corresponding read lines RL. Based on these photo-currents, the signal processor is able to process the detected biometric signals from the read lines, and recognize the valley lines and ridge lines in the palmprint, fingerprint, or footprint.

For example, when a palm touches a pixel region of the array substrate containing a semiconductor photodetector 102 in at least one subpixel, the ridge lines of the palmprint, fingerprint, or footprint is more likely in physical contact with the screen surface where the total reflection condition is changed locally upon touch, leading to the disruption of the total reflection locally. The disruption of the total reflection results in a reduced intensity of the light reflected by a ridge line of the palmprint, fingerprint, or footprint back to the subpixel. On the other hand, the light reached any valley line of the palmprint, fingerprint, or footprint substantially reflects back to the subpixel. This results in a light intensity difference between the light irradiating on the phototransistor T2 corresponding to the ridge lines and the light irradiating on the phototransistor T2 corresponding to the valley lines, which in turn leads to a difference between the photo-currents generated in the phototransistors T2 corresponding to the ridge lines and the valley lines.

In some embodiments, the control voltage signals are provided in a range such that a difference between a first photo-current in a first phototransistor due to a ridge line of a touching palm or finger or foot and a second photo-current in a second phototransistor due to a valley line of a touching palm or finger or foot is substantially maximized. That is, the gate node voltage of the phototransistors in the semiconductor photodetector 102 can be controlled in a certain range or a certain value to optimize its photo-sensitivity. As a result, a difference between a photo-current in response to a light reflected from a ridge line touching the display panel and a photo-current in response to a light reflected from a valley line touching the display panel is optimized or maximized.

Various appropriate phototransistors may be used for making the present array substrate. Examples of phototransistors include, but are not limited to, bipolar phototransistors and field effect phototransistors. In some embodiments, the phototransistor T2 is a field-effect phototransistor. Optionally, a control voltage signal is provided to the gate node of the field-effect phototransistor through the control voltage terminal V1. When the control voltage signal changes, the photo-sensitivity of the phototransistor T2 changes too, generating different photo-currents that pass through corresponding drain-source nodes. Thus, the control voltage signal can be set in a certain range or a certain value to control a gate-drain field strength for optimizing the photo sensitivity of the phototransistor T2 in the palmprint sensor 102, enhancing a photo-current induced by a light irradiated on the phototransistor, and maximizing the photo-current difference between a photo-current in response to a light reflected from a palm ridge line touching the display panel and a photo-current in response to a light reflected from a palm valley line touching the display panel. Thus, the present array substrate is intrinsically capable of facilitating detection of biometric signals with clear identification of palm ridge lines and palm valley lines in a palmprint, fingerprint, or footprint.

Optionally, the semiconductor photodetector 102 may include multiple switch transistors connected in parallel to the third transistor T3. Optionally, the semiconductor photodetector 102 may also include multiple phototransistors connected in parallel to the second transistor T2. Any of the transistors may be a transistor selected from a N-type transistor and a P-type transistor.

Various embodiments may be practiced to design the array substrate. Optionally, the number of semiconductor photodetectors 102 in each pixel units may be determined based on the nominal distance between a valley line and a neighboring valley line, the nominal distance between a ridge line and a neighboring ridge line, and the size of the pixel unit. For instance, the typical palmprint (or fingerprint or footprint) ridge spacing is greater than 100 μm and the typical valley spacing is larger than the ridge spacing, and the typical pixel size of the array substrate is in the range of 50-90 μm. Thus, the typical pixel size is relatively smaller than the distance between a valley line and a ridge line of a palmprint, fingerprint, or footprint. Optionally, each pixel unit of an array substrate includes only one subpixel 201 having a semiconductor photodetector 102.

Among the red, green, and blue light, the blue light is the one least affected by external environment. In some embodiments, the subpixel 201 is a blue subpixel. Optionally, only the blue light subpixel in each pixel unit is selected to be a subpixel 201 including both a display element 101 and a semiconductor photodetector 102 for biometric signal identification, whereas the red light pixel and the green light subpixel in each pixel unit are subpixels 202 including only a display element 101. In some embodiments, each subpixel of color (e.g., the red, green, or blue subpixel) is associated with a corresponding color filter layer. Optionally, the color filters are disposed within the subpixels in the array substrate. Optionally, the color filters are disposed on a color filter substrate that is used for packaging with the array substrate to form a final display panel. The color filters are disposed at positions corresponding to subpixels in the color filter substrate.

Figure 3:
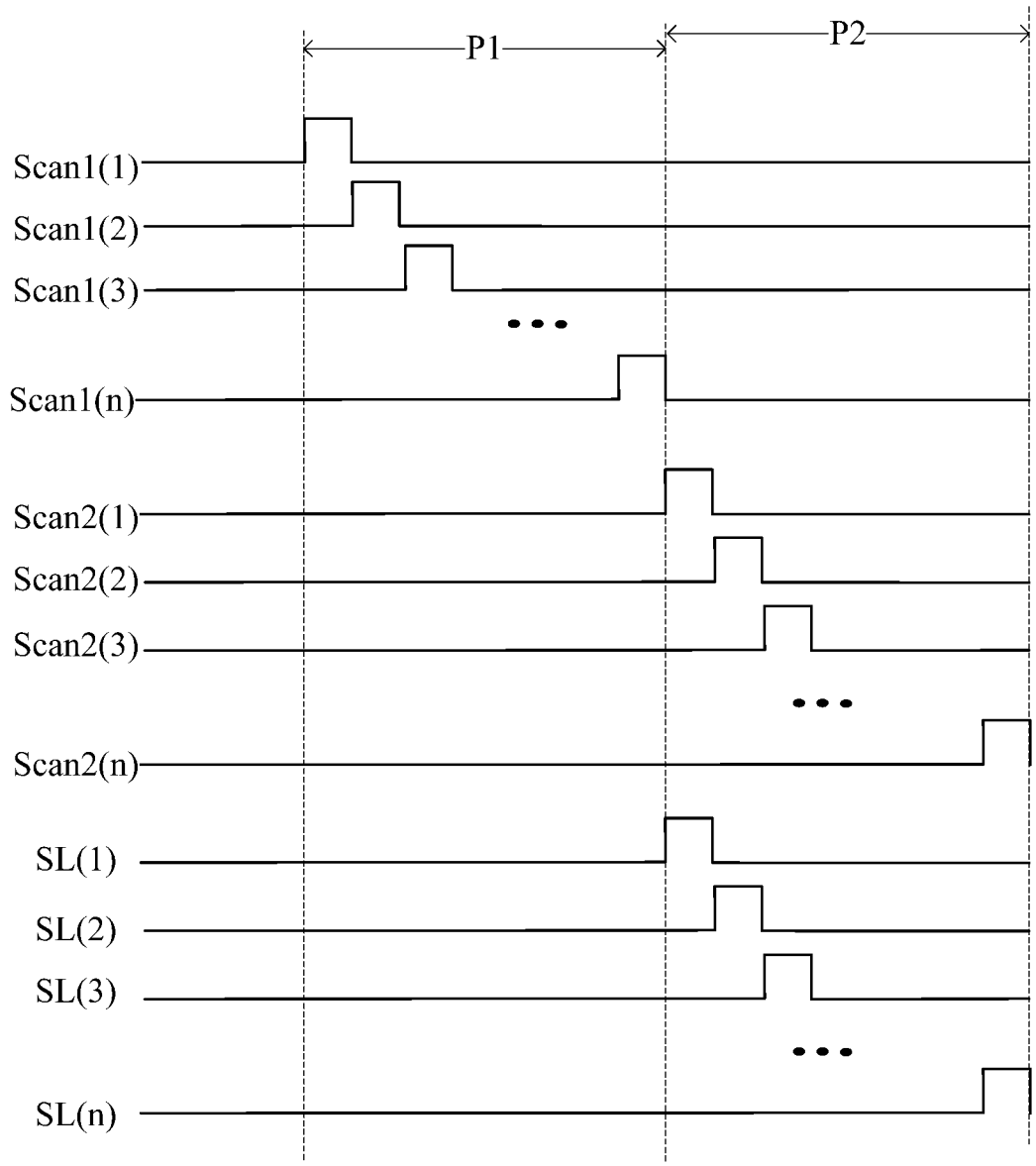
FIG. 3 is a diagram illustrating the time-division driving mode of an array substrate in some embodiments.

FIG. 3 is a diagram illustrating the time-division driving mode of an array substrate in some embodiments. Referring to FIG. 3, the scan signal for driving subpixels and the additional scan signal for driving senor elements are operated in a sequential order on row-by-row basis for detecting biometric signals. FIG. 3 describes a driving method for operating an array substrate as shown in FIG. 2 for detecting biometric signals. All transistors in FIG. 2 are N-type transistor.

Referring to FIG. 3, in a first time period P I, the driving method is implemented by loading a plurality of scan signals to a plurality of scan lines Scan1 sequentially on row-by-row basis. The scan signal is sent to each gate node of each first transistor T1 of each display element 101 in the corresponding row of pixel units to make the first transistor T1 in a conduction state between its first node and second node. A data signal inputted from each data line (which crosses over each scan line) charges the pixel electrode of each first capacitor C1 to generate a voltage signal between the pixel electrode and a common electrode for all subpixels. This voltage signal drives the liquid crystal (disposed at least in final display panel that is packaged with the array substrate) deflection to display a pixel of image. The same operation described above is repeated row-by-row (e.g., from the first row to the last row) to drive a plurality of scan lines, a complete image can be displayed.

Referring to FIG. 3, in a second time period P2 that is later in time than the first time period P1, the driving method is implemented by further loading a plurality of additional scan signals to a plurality of rows of additional scan lines Scan2 sequentially on row-by-row basis. The additional scan signal is transmitted to each gate node of each third transistor T3 of each semiconductor photodetector 102 in the corresponding row of pixel units to make the third transistor T3 in a conduction state between its first node and second node. The driving method is implemented at the same time by sending a control voltage signal through a signal line SL that is associated with the row of pixel units currently in operation. As a palm (portion) is in touch with a region of a touch-screen associated with the array substrate, each semiconductor photodetector 102 within the region is able to sense an intensity change of a light reflected from the surface of the touch screen back to the subpixel., e.g., a light reflected from a region corresponding to a ridge line of a palmprint (or fingerprint or footprint) or a light reflected from a region corresponding to a valley line of the palmprint (or fingerprint or footprint) on the touch screen. Under the control of a control voltage terminal V1 that is connected to the signal line SL, each second transistor (a phototransistor) T2 can be activated to generate a responsive photo-current from the light irradiation of the reflected light (e.g., the light reflected from either a ridge line region or the light reflected from a valley line region on touch-screen). The light reflected from a ridge line region has a relatively weaker intensity as compared to that of the light reflected from a valley line region. Consequentially, the photo-current induced by the light reflected from a ridge line region is relatively smaller as compared to the photo-current induced by the light reflected from a valley line region on touch-screen. The second transistor T2 is connected to the third transistor T3 that has been in conduction state, each photo-current signal generated by the phototransistor T2 directly passes through (and amplified by) T3, and is transmitted to a corresponding read line RL (which crosses over each scan line) connected to each corresponding semiconductor photodetector as a biometric signal.

In some embodiments, the plurality of signal lines SL can be connected to a pin of an integrated circuit board. From the pin, the control voltage signal can be supplied to each signal line SL. Optionally, the control voltage signal is a fixed voltage signal. Optionally, the control voltage is a pulse voltage signal. In some embodiments, the control voltage signal is designed, depending on specific applications, to control the phototransistor to generate responsive photo-current change when the light irradiation intensity changes. In particular, it is desired to set the control voltage signal in a certain range to achieve optimum photo-sensitivity to generate a maximized difference between the photo-current induced by the light reflected from a ridge line region is relatively smaller as compared to the photo-current induced by the light reflected from a valley line region on touch-screen.

Referring to FIG. 3, the same operation described above is repeated row-by-row (e.g., from the first row to the last row) to drive a plurality of additional scan lines. The plurality of semiconductor photodetectors 102 in a two-dimensional region of the array detect a collection of a plurality of biometric signals corresponding to the two-dimensional region. Each of the biometric signals is associated with a corresponding location information defined by each pixel unit location. The plurality of biometric signals and the location information correspond to a plurality of photo-current signals. As discussed above, a relatively weak photo-current signal corresponds to a ridge line region, whereas a relatively strong photo-current signal corresponds to a valley line region. Thus, the biometric signals associated with relatively weak photo-current signals correspond to ridge lines in a palm, and the biometric signals associated with relatively strong photo-current signals correspond to valley lines in a palm. The biometric information of the two-dimensional region may be obtained by processing the plurality of biometric signals and identifying a plurality of ridge lines and valley lines.

For example, an additional scan line Scan2 can be used to define an X-axis coordinate and a read line RL can be used to define a Y-axis coordinate for each subpixel 201 (containing a semiconductor photodetector 102) associated with the biometric information. Using this coordinate system, the biometric information can be linked to specific locations on the touch screen. Accordingly, the biometric information can be displayed at the corresponding positions on the screen, achieving biometric signal recognition.

In another aspect, the present disclosure provides a display panel having the array substrate described herein. Optionally, the display panel further includes a package substrate. Optionally, the display panel further includes a liquid crystal layers disposed between the array substrate and the package substrate.

In another aspect, the present disclosure provides a display apparatus having the array substrate described herein.

Figure 4:
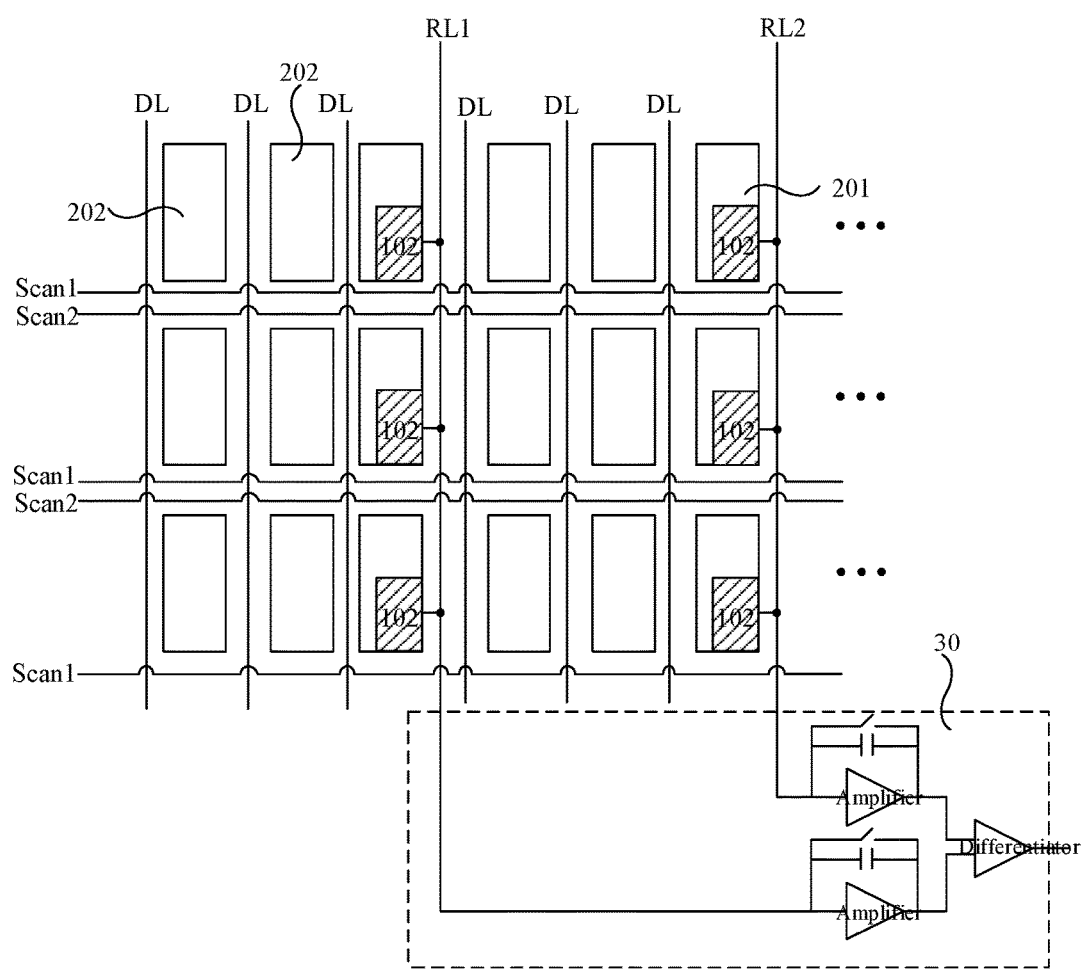
FIG. 4 is a diagram illustrating the structure of a display apparatus in some embodiments.

FIG. 4 is a diagram illustrating the structure of a display apparatus in some embodiments. Referring to FIG. 4, the display apparatus also includes a signal processor 30 connected to the plurality of read lines RL of the array substrate. The signal processor 30 is configured to receive all biometric signals outputted from the plurality of read lines RL, based on which all the biometric signals are processed for identifying the biometric information.

Referring to FIG. 4, the signal processor 30 is connected to at least a first read line RL1 linked to a first column of subpixels 201 containing semiconductor photodetectors 102 and a second read line RL2 linked to a second column of subpixels 201 containing semiconductor photodetectors 102. Optionally, the signal processor 30 includes a plurality of amplifiers and a plurality of differentiators. The plurality of amplifiers are connected to the plurality of read lines in a one-to-one relationship for amplifying read line signals. Each of the plurality of differentiators generates a differential value between amplified read line signals derived from two read line signals of any two neighboring read lines. For instance, as shown in FIG. 4, two signal amplifiers are respectively connected to two corresponding neighboring read line RL1 and RL2 and each has a corresponding output port. Each differentiator has two input ports respectively connected to the two output ports of the two signal amplifiers and has one output port for outputting a differential signal.

When a palm portion is in touch with the screen, the phototransistor T2 receives a reflected light from the touch screen, and generates a photo-current signal, which is then transmitted via a corresponding read line (for example RL1) to the signal processor 30, and subsequently amplified by a signal amplifier. Amplified read line signals derived from two read line signals of any two neighboring read lines are used as inputs for a differentiator for generating a differential value between amplified read line signals. For example, the differential value can be used for identification of ridge lines and valley lines. In some embodiments, the differential value has a first differential value corresponding to a scenario where two read line signals of two neighboring read lines correspond to one ridge line region and one valley line region. In some embodiments, the differential value has a second differential value corresponding to a scenario where two read line signals of two neighboring read lines correspond to two ridge line regions, or two valley line regions. Optionally, the first differential value is a positive value. In that case, the signal received from first one of the two read lines (e.g., RL1) is a biometric signal associated with reflection of a ridge line and another signal received from another one of the two read lines (e.g., RL2) is a biometric signal associated with reflection of a valley line. Optionally, the first differential value is a negative value. In that case, the signal received from first one of the two read lines (e.g., RL1) is a biometric signal associated with reflection of a valley line and another signal received from another one of the two read lines (e.g., RL2) is a biometric signal associated with reflection of a ridge line. Each read line has two neighboring red lines on two sides. For each read line, two differential values may be generated front amplified read line signals derived from two read line signals of any one of two pairs of neighboring read lines. By repeating the differentiation operation for multiple pairs of sequentially pairing read lines and analyzing the set of differential values as a whole, each biometric signal from a specific read line RL1 (or RL2) can be identified to be either from a valley line or ridge line without ambiguity.

Optionally, it is possible to define different gray levels for the palmprint (or fingerprint or footprint) based on different values of the outputted differential signals. Accordingly, the ridge lines and valley lines having corresponding gray levels may be displayed on screen.

Palmprint (or fingerprint or footprint) information generally includes the main lines, wrinkles, papillary pattern, and triangular minutiae points and so on. The main lines are the most prominent palm lines. Typically, there are three main lines for most human palms, which are so called the lifeline, emotion line, and intelligence line. Generally, wrinkles are shallower and thinner than the main lines, and mostly irregular. Papillary patterns are fingerprint-like patterns all over the palm. Triangular minutiae points are the center points of multiple triangle-shaped areas formed by the mastoid patterns on the palm. These triangle-shaped areas are located near the wrist below the middle finger and root area of each finger. All these biometric information can be illustrated by valley lines and ridge lines. Therefore, as the display apparatus detects a palmprint (or fingerprint or footprint) with clear identification of valley lines and ridge lines, the detail information as described above can be deduced and compared with stored biometric information in data base to achieve biometric signal recognition.

FIG. 5 is a flow chart illustrating a method for driving an operation of the array substrate in some embodiments. Referring to FIG. 5, the method in the embodiment includes providing a plurality of scan signals to the plurality of scan lines row-by-row; each scan line in a first time period applies a scan signal to each subpixel in the row of subpixels, allowing a data signal be passed from a corresponding data line to the each subpixel for producing a subpixel of image based on the data signal; providing a plurality of control voltage signals to the plurality of signal lines row-by-row; each signal line in a second time period applies a control voltage signal via the control voltage terminal to each semiconductor photodetector in the row of subpixels for detecting a biometric signal associated with a reflection intensity signal of the subpixel of image in each pixel unit; and providing a plurality of additional scan signals to the plurality of additional scan lines row-by-row; each additional scan line in the second time period applies an additional scan signal to the each semiconductor photodetectors in the row of subpixels to transmit the biometric signal generated in the each pixel unit to a corresponding read line; the second time period being later in time than the first time period.

In the present driving method, the scan line Scan1 is configured to provide a scan signal to the display element 101 in each subpixel in the row of subpixels, allowing a data signal to be passed from a corresponding data line DL to the display element 101. In this mode, the array substrate performs its image display function. In biometric signal sensing mode, the control voltage terminal V1 is configured to provide a control voltage signal to drive the corresponding semiconductor photodetectors 102 for detecting a biometric signal. The additional scan line Scan2 is configured to provide an additional scan signal to drive the semiconductor photodetectors 102 to transmit the detected biometric signal to a corresponding read line RL for biometric signal identification. A display apparatus having the present array substrate contains integrated semiconductor photodetectors 102, thus can perform both image display function and biometric information recognition function. As a biometric information detection and recognition device, the display apparatus having the present array substrate has greatly enhanced sensitivity in detecting biometric signals and accuracy in recognizing the biometric information. As compared to the conventional apparatus, the present display apparatus has a much simplified structure and significantly improved function.

In some embodiments, each display element 101 including a first transistor T1 and a pixel electrode 1011. In the first time period P1, the driving method is implemented by loading a plurality of scan signals to a plurality of scan lines Scan1 sequentially on row-by-row basis. The scan signal is sent to each gate node of each first transistor T1 of each display element 101 in the corresponding row of pixel units to make the first transistor T1 in a conduction state between its first node and second node. A data signal inputted from each data line (which crosses over each scan line) charges the pixel electrode of each first capacitor C1 to generate a voltage signal between the pixel electrode and a common electrode for all subpixels. This voltage signal drives the liquid crystal (disposed at least in final display panel that is packaged with the array substrate) deflection to display a pixel of image.

In some embodiments, each semiconductor photodetector 102 including a second transistor T2 and a third transistor T3. In a second time period P2 that is later in time than the first time period P1, the driving method is implemented by sending a control voltage signal to the control voltage terminal V1 through a signal line SL that is associated with the row of pixel units currently in operation. The control voltage signal controls the second transistor T2 to be in a conduction state between its first node and second node. When a palm (portion) is in touch with a region of a touch-screen associated with the array substrate, it may induce a photo-current change in the second transistor T2. Simultaneously in the second time period P2, the driving method also includes loading a plurality of additional scan signals to a plurality of rows of additional scan lines Scant sequentially on row-by-row basis. The additional scan signal is transmitted to each gate node of each third transistor T3 of each semiconductor photodetector 102 in the corresponding row of pixel units to make the third transistor T3 in a conduction state between its first node and second node. The second transistor T2 is connected to the third transistor T3 that has been in conduction state, each photo-current signal generated by the phototransistor T2 passes through (and amplified by) T3, and is transmitted as a biometric signal to a corresponding read line RL connected to each corresponding semiconductor photodetector 102.

The same operation described above is repeated row-by-row (e.g., from the first row to the last row) to drive a plurality of additional scan lines. The plurality of semiconductor photodetectors in a two-dimensional region of the array detect a collection of a plurality of biometric signals corresponding to the two-dimensional region. Each of the biometric signals is associated with a corresponding location information defined by each pixel unit location. The plurality of biometric signals and the location information correspond to a plurality of photo-current signals. As discussed above, a relatively weak photo-current signal corresponds to a ridge line region, whereas a relatively strong photo-current signal corresponds to a valley line region. Thus, the biometric signals associated with relatively weak photo-current signals correspond to ridge lines in a palm, and the biometric signals associated with relatively strong photo-current signals correspond to valley lines in a palm. The biometric information of the two-dimensional region may be obtained by processing the plurality of biometric signals and identifying a plurality of ridge lines and valley lines.

In some embodiments, an additional scan line Scan2 can be used to define an X-axis coordinate and a read line RL can be used to define a Y-axis coordinate for each subpixel 201 (containing a semiconductor photodetector 102) associated with the biometric information. Using this coordinate system, the biometric information can be linked to specific locations on the touch screen. Accordingly, the biometric information can be displayed at the corresponding positions on the screen, achieving biometric information recognition.

To avoid signal interference, optionally the first time period is a different time period from the second time period. For example, the second time period is later in time than the first time period. Optionally, the first time period and the second time period have different durations.

In some embodiments, each frame of image includes a first time period and a second time period. The first time period and the second time period are repeated in each frame of image. By having this time-division driving mode (e.g., a display mode and a sensing mode), both image display function and biometric information recognition function can be achieved using the present array substrate.

Figure 6:
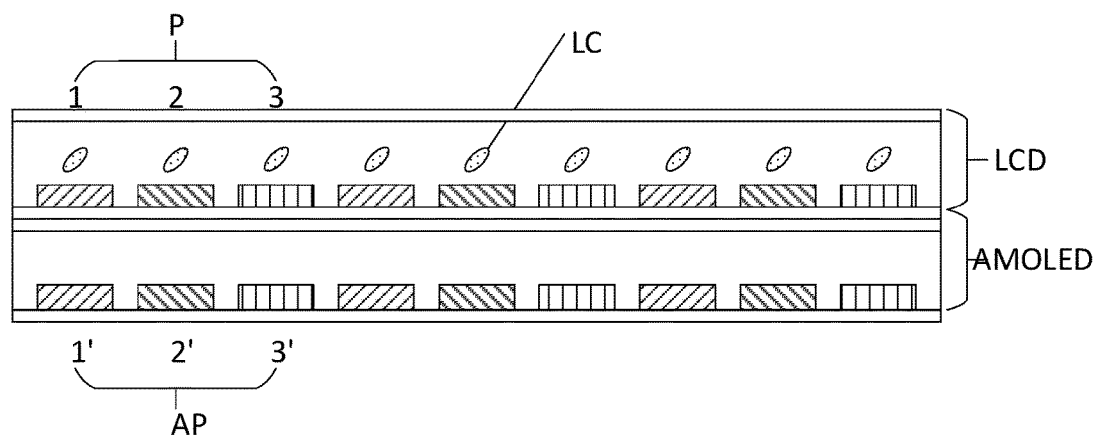
FIG. 6 is a diagram illustrating the structure of a display apparatus in some embodiments.

FIG. 6 is a diagram illustrating the structure of a display apparatus in some embodiments. Referring to FIG. 6, the display apparatus in the embodiment includes a liquid crystal display panel LCD and an active matrix organic light emitting display (AMOLED) panel AMOLED assembled together so that the AMOLED is configured to display image and the LCD is configured as a light value for turning on and off the light emitted from the AMOLED. The liquid crystal display panel includes a plurality of pixel units P. Each pixel unit P includes one or more subpixels. In FIG. 6, each pixel unit P includes three subpixels 1, 2, and 3. Optionally, each pixel unit P may include only one subpixel, e.g., a white subpixel. The subpixels 1, 2, and 3 may be a red subpixel 1, a green subpixel 2, and a blue subpixel 3. As discussed hereinthroughout, at least some of the plurality of pixel unit P includes a semiconductor photodetector (e.g., a photoresistor) in at least one subpixel. Optionally, at least one subpixel in each pixel unit of the liquid crystal display panel includes a semiconductor photodetector. For example, the subpixel 3 (e.g., a blue subpixel) may be the subpixel having the semiconductor photodetector whereas the subpixels 1 and 2 do not contain a semiconductor photodetector. Various alternative embodiments may be practiced to distribute the semiconductor photodetectors. For examples, the semiconductor photodetectors may be disposed in two out of every three subpixels, or in all three subpixels. Optionally, the semiconductor photodetectors may be substantially evenly disposed in 20%-40%, 40%-60%, or 60%-80% of all subpixels in the liquid crystal display panel.

The active matrix organic light emitting display (AMOLED) panel in FIG. 6 includes a plurality of AMOLED pixel units AP, each of which includes one or more AMOLED subpixel, e.g., AMOLED subpixels 1', 2', and 3'. Each AMOLED subpixel includes an organic light emitting diode. Optionally, the liquid crystal display panel LCD and the active matrix organic light emitting display panel AMOLED are configured so that each AMOLED subpixel corresponds to one or more subpixel of the liquid crystal display panel. For example, each AMOLED subpixel may correspond to each subpixel of the liquid crystal display panel in a one-to-one relationship.

Various appropriate structures may be used for making and using the present display apparatus. For example, the liquid crystal display panel LCD may include a transparent base substrate and a package substrate opposite to the transparent base substrate. Similarly, the active matrix organic light emitting display panel AMOLED may include a base substrate and a package substrate. Optionally, the base substrate of the liquid crystal display panel LCD and the package substrate of the active matrix organic light emitting display panel AMOLED may be integrated as a single substrate as long as the subpixels of the liquid crystal display panel LCD and the AMOLED subpixels are aligned in a way so that liquid crystal display panel LCD is configured to control the light emitted from the active matrix organic light emitting display panel AMOLED (e.g., turning on and off).

In some embodiments, the semiconductor photodetector in the liquid crystal display panel LCD is disposed within an area corresponding to an intersubpixel region of the liquid crystal display panel LCD to achieve an increased aperture ratio. The LCD pixel unit comprises a subpixel region and an intersubpixel region. As used herein, a subpixel region refers to a light emission region of a subpixel, such as a region corresponding to a pixel electrode in a liquid crystal display. Optionally, a pixel may include a number of separate light emission regions corresponding to a number of subpixels in the pixel. Optionally, the subpixel region is a light emission region of a red color subpixel. Optionally, the subpixel region is a light emission region of a green color subpixel. Optionally, the subpixel region is a light emission region of a blue color subpixel. Optionally, the subpixel region is a light emission region of a white color subpixel. As used herein, an inter-subpixel region refers to a region between adjacent subpixel regions, such as a region corresponding to a black matrix in a liquid crystal display. Optionally, the inter-subpixel region is a region between adjacent subpixel regions in a same pixel. Optionally, the inter-subpixel region is a region between two adjacent subpixel regions from two adjacent pixels. Optionally, the inter-subpixel region is a region between a subpixel region of a red color subpixel and a subpixel region of an adjacent green color subpixel. Optionally, the inter-subpixel region is a region between a subpixel region of a red color subpixel and a subpixel region of an adjacent blue color subpixel. Optionally, the inter-subpixel region is a region between a subpixel region of a green color subpixel and a subpixel region of an adjacent blue color subpixel.

In some embodiments, the liquid crystal display panel includes an array substrate described hereinthroughout. For examples, the liquid crystal display panel may include the array substrates in FIGS. A-1B and 2A-2B. In some embodiments, the array substrate includes a plurality of scan lines and a plurality of data lines, each scan line being connected to a row of subpixels, each data line being connected to a column of subpixels; and a plurality of read lines, each read line being connected to each semiconductor photodetector in a column of subpixels having the semiconductor photodetector in a column of pixel units.

As described hereinthroughout, in some embodiments, the plurality of scan lines are configured to drive the plurality of pixel units row-by-row. For example, the display apparatus may be operated in a time-division mode. In a first time period, the display apparatus may be operated in a display mode, during which each scan line is configured to apply a scan signal to each subpixel in the row of subpixels to allow a data signal be passed from a corresponding data line to the each subpixel to produce a subpixel of image based on the data signal. In some embodiments, the time-division model further includes a biometric signal reading mode. For example, each frame of image may include a second time period, during which each read line is configured to transmit a biometric signal from the each semiconductor photodetector, the second time period being later in time than the first time period.

The time-division mode may further include a touch detection mode for determining a touch area where the touch event has occurred. Once the touch area is determined, the display mode and the biometric signal reading mode may be limited to an area of the display apparatus substantially corresponding to the touch area. By limiting biometric information scanning to an area substantially corresponding to the touch area, the present apparatus requires much less power consumption and memory for detecting biometric information.

In some embodiments, the display apparatus includes a plurality of touch electrodes and a plurality of touch signal lines for detecting touch events. Optionally, each touch electrode being connected to each touch signal line in a one-to-one relationship. For example, each frame of image or at least some frame of image includes a touch detection time period, during which each touch signal line is configured to apply a touch signal to each touch electrode for detecting a touch event at each touch electrode thereby determining a plurality of pixel units in a touch area where the touch event is detected.

In some embodiments, if a touch event is detected, the plurality of scan lines are configured to drive the plurality of pixel units in at least a portion of the touch area (e.g., the entire touch area or the central region of the touch area) row-by-row. Each scan line in the first time period is configured to apply a scan signal to each subpixel in the row of subpixels in the at least a portion of the touch area to allow the data signal be passed from a corresponding data line to the each subpixel to produce a subpixel of image based on the data signal e.g., the image display in the display apparatus in the first time period is substantially limited to the at least a portion of the touch area. Accordingly, in the second time period, each read line is configured to transmit the biometric signal from each semiconductor photodetector in the touch area, the second time period being later in time than the first time period.

Various embodiments may be practiced to make and use a touch detection structure in the display apparatus. The touch electrode may be an in-cell type touch electrode or and on-cell type touch electrode. The touch detection may be a mutual capacitative type touch detection or a self-capacitative type touch detection. For example, the display apparatus may include a touch control layer on the package substrate of the liquid crystal display panel. In some embodiments, the touch detection is a mutual capacitative type touch detection. Optionally, a plurality of scan lines and a plurality of data lines are used as touch electrode for detecting a touch event and determining a touch area.

In some embodiments, if a touch event is detected, the active matrix organic light emitting display panel AMOLED is configured to display an image limited to an area substantially corresponding to the touch area. For example, the active matrix organic light emitting display panel is configured to turn off image display in a plurality of AMOLED subpixels substantially outside at least a portion of the touch area, and display an image in a plurality of AMOLED subpixels substantially within the at least a portion of the touch area. The biometric information scanning is limited to the at least a portion of the touch area by limiting the AMOLED image display area.

Accordingly, the present disclosure provides a method for driving an operation of a display apparatus described herein. In some embodiments, the method includes providing a plurality of scan signals to the plurality of scan lines row-by-row in a first time period of each frame of image; each scan line in the first time period applies a scan signal to each subpixel in the row of subpixels to allow a data signal be passed from a corresponding data line to the each subpixel to produce a subpixel of image based on the data signal; and transmitting a plurality of biometric signals through the plurality of read lines column-by-column; each read line in a second time period is configured to transmit a biometric signal from the each semiconductor photodetector, the second time period being later in time than the first time period.

In some embodiments, the driving method further includes a touch detection mode. The method further includes providing a plurality of touch signals to the plurality of touch electrodes through the plurality of touch signal lines row-by-row in a touch detection rime period of each frame of image; each touch signal line in the touch detection time period applies a touch signal to each touch electrode for detecting a touch event at each touch electrode thereby determining a plurality of pixel units in a touch area where the touch event is detected. If a touch event is detected, the biometric information scanning may be limited to an area substantially corresponding to the touch area.

Figure 7:
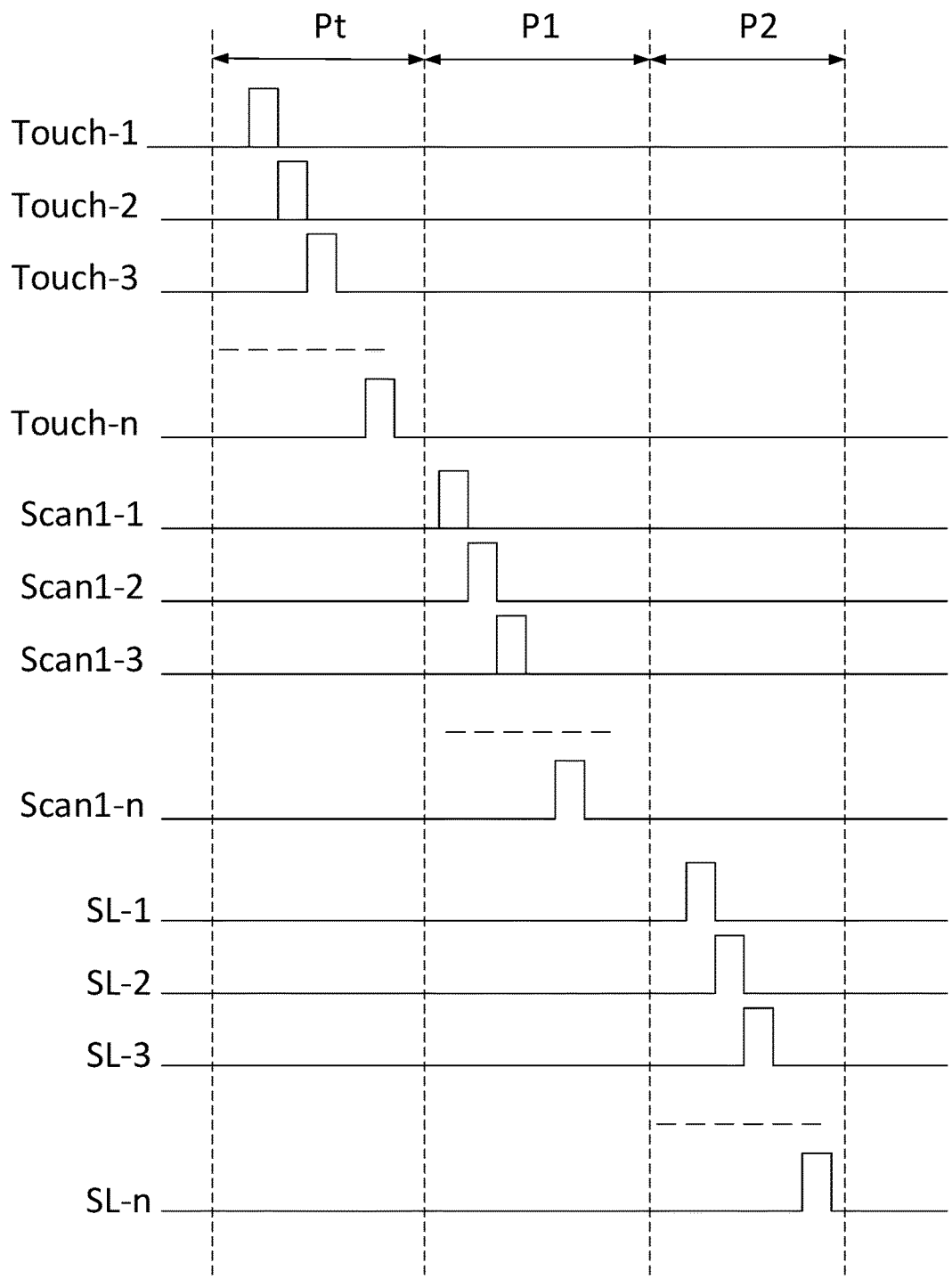
FIG. 7 is a diagram illustrating the time-division driving mode of a display apparatus in some embodiments.

FIG. 7 is a diagram illustrating the time-division driving mode of a display apparatus in some embodiments. Referring to FIG. 7, the driving method in the embodiment includes a touch detection mode corresponding to a touch detection time period Pt, a display mode corresponding to a first time period P1, and a biometric signal detection mode corresponding to a second time period P2.

Referring to FIG. 7, the driving method in the embodiment is implemented by providing a plurality of touch signals to the plurality of touch electrodes through the plurality of touch signal lines row-by-row in a touch detection time period of each frame of image; each touch signal line in the touch detection time period applies a touch signal to each touch electrode for detecting a touch event at each touch electrode thereby determining a plurality of pixel units in a touch area where the touch event is detected. If a touch event is detected, the driving method is further implemented by providing the plurality of scan signals to the plurality of scan lines row-by-row in the first time period of each frame of image; each scan line in the first time period applies the scan signal to each subpixel in the row of subpixels in at least a portion of the touch area to allow a data signal be passed from a corresponding data line to the each subpixel to produce a subpixel of image based on the data signal; and providing a plurality of control voltage signals to the plurality of signal lines row-by-row in a second time period of each frame of image; each signal line in the second time period applies a control voltage signal via the control voltage terminal to each second transistor in the row of subpixels in the at least a portion of the touch area for detecting a biometric signal in each pixel unit.

In some embodiments, the biometric information scanning may be limited to the at least a portion of the touch area by limiting the AMOLED image display area. In some embodiments, the method includes providing a plurality of AMOLED scan signals to a plurality of AMOLED scan lines row-by-row in the first time period of each frame of image; each AMOLED scan line in the first time period applies an AMOLED scan signal to each AMOLED subpixel in the row of AMOLED subpixels in at least a portion of the touch area to allow a AMOLED data signal be passed from a corresponding data line to the each subpixel to produce a subpixel of image based on the data signal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
a liquid crystal display (LCD) panel comprising an array of a plurality of LCD pixel units; a respective one of the plurality of LCD pixel units comprising one or more LCD subpixels, at least some of the plurality of LCD pixel units comprising a semiconductor photodetector in at least one LCD subpixel for detecting biometric information; and
an active matrix organic light emitting display (AMOLED) panel comprising an array of a plurality of AMOLED pixel units, a respective one of the plurality of AMOLED pixel units comprising one or more AMOLED subpixels, each of which comprising an organic light emitting diode;
wherein a respective one of the one or more AMOLED subpixels is configured to provide back light for at least one of the one or more LCD subpixels of the respective one of the plurality of AMOLED pixel units;
upon a touch event, the AMOLED panel is configured to selectively provide back light to the LCD panel in an area substantially corresponding to a touch area and at the same time selectively turn off back light to the LCD panel outside the area substantially corresponding to the touch area; and
biometric information scanning is limited to the area substantially corresponding to the touch area.

2. The display apparatus of claim 1, wherein the respective one of the plurality of LCD pixel units comprises a subpixel region and an intersubpixel region, the semiconductor photodetector is in the intersubpixel region.

3. The display apparatus of claim 1, wherein the liquid crystal display panel further comprises:
a plurality of scan lines and a plurality of data lines, a respective one of the plurality of scan lines being connected to a row of LCD subpixels, a respective one of the plurality of data lines being connected to a column of LCD subpixels; and
a plurality of read lines, a respective one of the plurality of read lines being connected to the semiconductor photodetector in a column of LCD subpixels having the semiconductor photodetector in a column of LCD pixel units;
wherein the plurality of scan lines are configured to drive the plurality of LCD pixel units; the respective one of the plurality of scan lines in a first time period is configured to apply a scan signal to a respective one of the plurality of LCD pixel units in the row of LCD subpixels to allow a data signal be passed from a corresponding data line to the respective one of the plurality of LCD pixel units to produce a subpixel of image based on the data signal; the respective one of the plurality of read lines in a second time period is configured to transmit a biometric signal from the semiconductor photodetector, the second time period being later in time than the first time period.

4. The display apparatus of claim 3, wherein the semiconductor photodetector is configured to detect a difference between a first biometric signal change corresponding to a ridge line of a touching palm or finger and a second biometric signal change corresponding to a valley line of a touching palm or finger.

5. The display apparatus of claim 3, further comprising a plurality of touch electrodes and a plurality of touch signal lines, a respective one of the plurality of touch electrodes being connected to a respective one of the plurality of touch signal lines;
wherein the respective one of the plurality of touch signal lines in a touch detection time period is configured to apply a touch signal to the respective one of the plurality of touch electrodes for detecting a touch event at the respective one of the plurality of touch electrodes thereby determining a plurality of LCD pixel units in a touch area where the touch event is detected.

6. The display apparatus of claim 5, wherein the plurality of scan lines are configured to drive the plurality of LCD pixel units in at least a portion of the touch area; the respective one of the plurality of scan lines in the first time period is configured to apply the scan signal to the respective one of the plurality of LCD pixel units in the row of LCD subpixels in the at least a portion of the touch area to allow the data signal be passed from a corresponding data line to a respective one of the one or more LCD subpixels to produce a subpixel of image based on the data signal; the respective one of the plurality of read lines in the second time period is configured to transmit the biometric signal from the semiconductor photodetector in the touch area, the second time period being later in time than the first time period.

7. The display apparatus of claim 5, wherein the active matrix organic light emitting display panel is configured to turn off image display in a plurality of AMOLED subpixels substantially outside at least a portion of the touch area, and display an image in a plurality of AMOLED subpixels substantially within the at least a portion of the touch area.

8. The display apparatus of claim 1, wherein the respective one of the one or more AMOLED subpixels is configured to provide back light for a single one of the one or more LCD subpixels of the respective one of the plurality of AMOLED pixel units.

9. The display apparatus of claim 3, wherein the liquid crystal display panel further comprises:
a plurality of control voltage terminals, a respective one of the plurality of control voltage terminals being connected to the semiconductor photodetector in a one-to-one relationship;
a plurality of signal lines, a respective one of the plurality of signal lines is connected to a row of control voltage terminals in a row of LCD pixel units for providing a control voltage signal; and
a plurality of additional scan lines, a respective one of the plurality of additional scan lines being connected to a row of semiconductor photodetectors in a row of LCD pixel units; wherein the semiconductor photodetector comprises a second transistor, and a third transistor comprising a gate node connected to a corresponding additional scan line and a second node connected to a corresponding read line;
a respective one of the one or more LCD subpixels comprises a first transistor and a pixel electrode; the first transistor comprising a gate node connected to a corresponding scan line, a first node connected to a corresponding data line, and a second node connected to the pixel electrode;
the second transistor is a phototransistor comprising a gate node and a first node commonly connected to a corresponding control voltage terminal and a second node connected to a corresponding read line.

10. The display apparatus of claim 1, wherein the respective one of the plurality of LCD pixel units comprises a red subpixel, a green subpixel, and a blue subpixel, wherein the blue subpixel includes the semiconductor photodetector.

11. The display apparatus of claim 9, wherein the plurality of scan lines, the plurality of signal lines, and the plurality of additional scan lines are configured to drive the plurality of LCD pixel units;
the respective one of the plurality of scan lines in a first time period is configured to apply a scan signal to the respective one of the one or more LCD subpixels in the row of LCD subpixels, allowing a data signal be passed from a corresponding data line to the respective one of the one or more LCD subpixels to produce a subpixel of image based on the data signal;
the respective one of the plurality of signal lines in a second time period is configured to apply a control voltage signal via the control voltage terminal to the semiconductor photodetector in the row of LCD subpixels for detecting a biometric signal in the respective one of the plurality of LCD pixel units; and
the respective one of the plurality of additional scan lines in the second time period is configured to apply an additional scan signal to the semiconductor photodetector in the row of LCD subpixels to transmit the biometric signal at the the respective one of the plurality of LCD pixel units to a corresponding read line; the second time period being later in time than the first time period.

12. The display apparatus of claim 9, wherein the plurality of scan lines, the plurality of additional scan lines, and the plurality of signal lines are configured to drive the plurality of LCD pixel units;

the respective one of the plurality of scan lines in a first time period is configured to apply a scan signal to the respective one of the one or more LCD subpixels in the row of LCD subpixels to switch on a corresponding first transistor, allowing a data signal be passed from a corresponding data line to a corresponding pixel electrode to produce a subpixel of image based on the data signal;

the respective one of the plurality of signal lines in a second time period is configured to apply a control voltage signal via the control voltage terminal to the phototransistor in the row of LCD subpixels for detecting a biometric signal in the respective one of the plurality of LCD pixel units; and the respective one of the plurality of additional scan lines in the second time period is configured to apply an additional scan signal to switch on the third transistor in the row of LCD subpixels for transmitting the biometric signal detected in the respective one of the plurality of LCD pixel units to a corresponding read line; the second time period being later in time than the first time period.

13. The display apparatus of claim 12, wherein the control voltage signal is configured to be in a range such that a difference between a first photocurrent change corresponding to a ridge line of a touch palm or finger and a second photocurrent change corresponding to a valley line of a touching palm or finger is substantially maximized.

14. The apparatus of claim 1, further comprising a signal processor, the signal processor comprising a plurality of amplifiers connected to the plurality of read lines in a one-to-one relationship for amplifying read line signals, and a plurality of differentiators for generating a differential value based on amplified read line signals derived from two read line signals of any two neighboring read lines.

15. A method for driving an operation of a display apparatus comprising:
a liquid crystal display panel (LCD) comprising an array of a plurality of LCD pixel units; a respective one of the plurality of LCD pixel units comprising one or more LCD subpixels, at least some of the plurality of LCD pixel units comprising a semiconductor photodetector in at least one LCD subpixel for detecting biometric information; a plurality of scan lines and a plurality of data lines, a respective one of the plurality of scan lines being connected to a row of LCD subpixels, a respective one of the plurality of data lines being connected to a column of LCD subpixels; and a plurality of read lines, a respective one of the plurality of read lines being connected to the semiconductor photodetector in a column of LCD subpixels having the semiconductor photodetector in a column of LCD pixel units; and
an active matrix organic light emitting display (AMOLED) panel comprising an array of a plurality of AMOLED pixel units, a respective one of the plurality of AMOLED pixel units comprising one or more AMOLED subpixels, each of which comprising an organic light emitting diode; wherein the liquid crystal display panel and the active matrix organic light emitting display panel are configured so that a respective one of the one or more AMOLED subpixels is configured to provide back light for at least one of the one or more LCD subpixels of the respective one of the plurality of AMOLED pixel units;
the method comprising:
providing a plurality of scan signals to the plurality of scan lines in a first time period of each frame of image;
the respective one of the plurality of scan lines in the first time period applies a scan signal to the respective one of the one or more LCD subpixels in the row of LCD subpixels to allow a data signal be passed from a corresponding data line to the respective one of the one or more LCD subpixels to produce a subpixel of image based on the data signal; and transmitting a plurality of biometric signals through the plurality of read lines; the respective one of the plurality of read lines in a second time period is configured to transmit a biometric signal from the semiconductor photodetector, the second time period being later in time than the first time period;

wherein, upon a touch event, the method further comprises selectively providing back light to the LCD panel by the AMOLED panel in an area substantially corresponding to a touch area and at the same time selectively turning off back light to the LCD panel outside the area substantially corresponding to the touch area; and biometric information scanning is limited to the area substantially corresponding to the touch area.

16. The method of claim 15, wherein the display apparatus further comprising a plurality of touch electrodes and a plurality of touch signal lines, a respective one of the plurality of touch electrodes being connected to a respective one of the plurality of touch signal lines;
the method further comprising:
providing a plurality of touch signals to the plurality of touch electrodes through the plurality of touch signal lines in a touch detection time period of each frame of image; the respective one of the plurality of touch signal lines in the touch detection time period applies a touch signal to the respective one of the plurality of touch electrodes for detecting a touch event at the respective one of the plurality of touch electrodes thereby determining a plurality of LCD pixel units in a touch area where the touch event is detected.

17. The method of claim 16, comprising:
providing the plurality of scan signals to the plurality of scan lines in the first time period of each frame of image; the respective one of the plurality of scan lines in the first time period applies the scan signal to the respective one of the one or more LCD subpixels in the row of LCD subpixels in at least a portion of the touch area to allow a data signal be passed from a corresponding data line to the respective one of the one or more LCD subpixels to produce a subpixel of image based on the data signal; and
transmitting a plurality of biometric signals through the plurality of read lines; the respective one of the plurality of read lines in the second time period is configured to transmit a biometric signal from the semiconductor photodetector in the at least a portion of the touch area, the second time period being later in time than the first time period.

18. The method of claim 16, comprising:
providing a plurality of AMOLED scan signals to a plurality of AMOLED scan lines in the first time period of each frame of image; a respective one of the plurality of AMOLED scan lines in the first time period applies an AMOLED scan signal to the respective one of the one or more AMOLED subpixels in a row of AMOLED subpixels in at least a portion of the touch area to allow a AMOLED data signal be passed from a corresponding AMOLED data line to the respective one of the one or more AMOLED subpixels to produce a subpixel of image based on the AMOLED data signal.

19. The method of claim 15, wherein the liquid crystal display panel further comprises:
- a plurality of scan lines and a plurality of data lines, a respective one of the plurality of scan lines being connected to a row of LCD subpixels, a respective one of the plurality of data lines being connected to a column of LCD subpixels;
- a plurality of control voltage terminals, a respective one of the plurality of control voltage terminals being connected to the semiconductor photodetector in a one-to-one relationship;
- a plurality of read lines, a respective one of the plurality of read lines being connected to the semiconductor photodetector in a column of LCD pixel units;
- a plurality of signal lines, a respective one of the plurality of signal lines is connected to a row of control voltage terminals in a row of LCD pixel units for providing a control voltage signal; and
- a plurality of additional scan lines, a respective one of the plurality of additional scan lines being connected to a row of semiconductor photodetectors in a row of LCD pixel units; wherein the semiconductor photodetector comprises a second transistor, and a third transistor comprising a gate node connected to a corresponding additional scan line and a second node connected to a corresponding read line;
- a respective one of the one or more LCD subpixels comprises a first transistor and a pixel electrode; the first transistor comprising a gate node connected to a corresponding scan line, a first node connected to a corresponding data line, and a second node connected to the pixel electrode; and
- the second transistor is a phototransistor comprising a gate node and a first node commonly connected to a corresponding control voltage terminal and a second node connected to a corresponding read line;

the method comprising:
- providing a plurality of scan signals to the plurality of scan lines in a first time period of each frame of image; the respective one of the plurality of scan lines in the first time period applies a scan signal to the respective one of the one or more LCD subpixels in the row of LCD subpixels to allow a data signal be passed from a corresponding data line to the the respective one of the one or more LCD subpixels to produce a subpixel of image based on the data signal;
- providing a plurality of control voltage signals to the plurality of signal lines in a second time period of each frame of image; the respective one of the plurality of signal lines in the second time period applies a control voltage signal via the control voltage terminal to the second transistor in the row of LCD subpixels for detecting a biometric signal in the respective one of the plurality of LCD pixel units; and
- providing a plurality of additional scan signals to the plurality of additional scan lines in the second time period of each frame of image; a respective one of the plurality of additional scan lines in the second time period applies an additional scan signal to the third transistor in the row of LCD subpixels for transmitting the biometric signal at the respective one of the plurality of LCD pixel units to a corresponding read line; the second time period being later in time than the first time period.

20. The method of claim 19, wherein the plurality of control voltage signals are provided in a range such that a difference between a first photocurrent change corresponding to a ridge line of a touching palm or finger and a second photocurrent change corresponding to a valley line of a touching palm or finger is substantially maximized.

* * * * *